US010877772B2

(12) United States Patent
Wang et al.

(10) Patent No.: US 10,877,772 B2
(45) Date of Patent: Dec. 29, 2020

(54) IMAGE DEPLOYMENT METHOD AND APPARATUS

(71) Applicant: Huawei Technologies Co., Ltd., Shenzhen (CN)

(72) Inventors: Hang Wang, Xi'an (CN); Jincheng Li, Xi'an (CN); Zhe Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 15/916,895

(22) Filed: Mar. 9, 2018

(65) Prior Publication Data

US 2018/0196680 A1 Jul. 12, 2018

Related U.S. Application Data

(63) Continuation of application No. PCT/CN2016/095533, filed on Aug. 16, 2016.

(30) Foreign Application Priority Data

Sep. 10, 2015 (CN) .......................... 2015 1 0572458

(51) Int. Cl.
*G06F 9/445* (2018.01)
*G06F 16/178* (2019.01)
(Continued)

(52) U.S. Cl.
CPC .............. *G06F 9/445* (2013.01); *G06F 8/63* (2013.01); *G06F 9/45558* (2013.01);
(Continued)

(58) Field of Classification Search
CPC ........... G06F 2201/815; G06F 11/2023; G06F 11/2094; G06F 11/3051; G06F 2201/805;
(Continued)

(56) References Cited

U.S. PATENT DOCUMENTS

| | | | |
|---|---|---|---|
| 10,243,793 B1 * | 3/2019 | di Proietto | .......... H04L 41/0893 |
| 2005/0005200 A1 * | 1/2005 | Matena | ................. G06F 9/5072 |
| | | | 714/38.13 |

(Continued)

FOREIGN PATENT DOCUMENTS

| CN | 102307241 A | 1/2012 |
|---|---|---|
| CN | 102521014 A | 6/2012 |

(Continued)

OTHER PUBLICATIONS

Qingjin et al., "Analysis of Docker Realization", Information and Communications Technologies, 2015, 4 pages.

*Primary Examiner* — Angelica Ruiz
(74) *Attorney, Agent, or Firm* — Slater Matsil, LLP (57) ABSTRACT

An image deployment method includes obtaining a configuration policy for a container, where the configuration policy for the container includes an autoscaling policy or a replication control policy. The autoscaling policy includes a first image identifier, a maximum quantity of containers corresponding to the first image identifier that can be deployed, and a quantity of currently deployed containers corresponding to the first image identifier. The replication control policy includes a second image identifier and a quantity of containers corresponding to the second image identifier that are expected to be deployed. The method determines an identifier of a to-be-deployed image according to the configuration policy for the container.

20 Claims, 2 Drawing Sheets

(51) Int. Cl.
  *G06F 16/182*    (2019.01)
  *G06F 9/455*     (2018.01)
  *G06F 8/61*      (2018.01)
  *G06F 9/50*      (2006.01)
(52) U.S. Cl.
  CPC .......... *G06F 9/5077* (2013.01); *G06F 16/178* (2019.01); *G06F 16/184* (2019.01); *G06F 2009/45562* (2013.01)
(58) Field of Classification Search
  CPC ............ G06F 2201/82; G06F 9/45558; G06F 21/554; G06F 9/5038; G06F 9/5077
  USPC ........... 707/600–831, 899, 999.001–999.206
  See application file for complete search history.

(56) References Cited

U.S. PATENT DOCUMENTS

| | | | | |
|---|---|---|---|---|
| 2012/0072762 | A1* | 3/2012 | Atchison | G06F 9/5072 714/2 |
| 2013/0086273 | A1* | 4/2013 | Wray | G06F 9/5072 709/226 |
| 2013/0332484 | A1* | 12/2013 | Gajic | G06F 16/21 707/770 |
| 2014/0189090 | A1* | 7/2014 | Mikkilineni | H04L 41/0886 709/223 |
| 2014/0195490 | A1 | 7/2014 | Leverett et al. | |
| 2014/0317293 | A1* | 10/2014 | Shatzkamer | G06F 9/45558 709/226 |
| 2014/0325503 | A1 | 10/2014 | Li | |
| 2015/0205602 | A1* | 7/2015 | Prismon | G06F 8/71 717/121 |
| 2015/0248306 | A1 | 9/2015 | Dawson et al. | |
| 2015/0378847 | A1* | 12/2015 | Tarasuk-Levin | G06F 11/2097 714/19 |

FOREIGN PATENT DOCUMENTS

| | | |
|---|---|---|
| CN | 103197952 A | 7/2013 |
| CN | 103905508 A | 7/2014 |
| CN | 104503882 A | 4/2015 |
| CN | 104539708 A | 4/2015 |
| CN | 104618164 A | 5/2015 |

* cited by examiner

IMAGE DEPLOYMENT METHOD AND APPARATUS

CROSS-REFERENCE TO RELATED APPLICATIONS

This application is a continuation of International Application No. PCT/CN2016/095533, filed on Aug. 16, 2016, which claims priority to Chinese Patent Application No. 2015/10,572,458.9, filed on Sep. 10, 2015. The disclosures of the aforementioned applications are hereby incorporated by reference in their entireties.

TECHNICAL FIELD

Embodiments of the present invention relate to the field of computer technologies, and in particular, to an image deployment method and apparatus, and a computer system.

BACKGROUND

In the prior art, one or more containers are usually deployed on one node or one host. A container type is usually corresponding to an application, that is, containers that run a same application may be considered as containers of a same type. When a user needs to deploy a container of an application on a node or a host, the user first needs to obtain an image corresponding to the application, and then creates the corresponding container according to the image. The user may create, on the node or the host according to an image corresponding to an application, a plurality of containers that run the application.

A major feature of deploying an application by using a container technology is quick start. However, before starting a container of an application, any node or host needs to first obtain an image corresponding to the application. A popular or latest image is usually stored in an image repository. When a user needs to start, on the node or the host, a container corresponding to an application, a container start speed is often restricted by time consumed in obtaining an image corresponding to the application.

SUMMARY

Embodiments of the present invention resolve a problem provided in the prior art, that container start efficiency is reduced because an image needs to be obtained when a container is being deployed.

A first aspect of embodiments of the present invention provides an image deployment method, including obtaining a configuration policy for a container, where the configuration policy for the container includes an autoscaling policy or a replication control policy. The autoscaling policy includes a first image identifier, a maximum quantity of containers that are corresponding to the first image identifier and that can be deployed, and a quantity of currently deployed containers corresponding to the first image identifier. The replication control policy includes a second image identifier and a quantity of containers that are corresponding to the second image identifier and that are expected to be deployed. The method also includes determining an identifier of a to-be-deployed image according to the configuration policy for the container.

With reference to the first aspect, in a first implementation of the first aspect, the method further includes obtaining popularity information of an image, where the popularity information of the image includes a third image identifier and a popularity index of the image corresponding to the third image identifier. Determining an identifier of a to-be-deployed image according to the configuration policy for the container further includes: determining the identifier of the to-be-deployed image according to the popularity information of the image.

With reference to the first aspect or the first implementation of the first aspect, in a second implementation of the first aspect, the method further includes determining, according to the configuration policy for the container corresponding to the identifier of the to-be-deployed image, a quantity of containers that are corresponding to the to-be-deployed image and that are expected to be deployed.

With reference to the first implementation of the first aspect, in a third implementation of the first aspect, the method further includes determining, according to the configuration policy for the container corresponding to the identifier of the to-be-deployed image and the popularity information of the to-be-deployed image, a quantity of containers that are corresponding to the to-be-deployed image and that are expected to be deployed. A quantity of nodes on which the to-be-deployed image needs to be deployed in advance can be known by determining the quantity of containers that are corresponding to the to-be-deployed image and that are expected to be deployed, so that if the nodes corresponding to the to-be-deployed image need to be started, the containers can be directly started on the nodes on which the image is deployed in advance, and the image does not need to be obtained from an image repository when the containers are being started, so as to effectively increase a container start speed.

With reference to the second or the third implementation of the first aspect, in a fourth implementation of the first aspect, the method further includes obtaining load status information of each node and a list of an image deployed on each node. A value relationship is determined between a quantity of containers that are corresponding to the to-be-deployed image and that have been deployed and the quantity of containers that are corresponding to the to-be-deployed image and that are expected to be deployed. If the quantity of containers that are corresponding to the to-be-deployed image and that have been deployed is less than the quantity of containers that are corresponding to the to-be-deployed image and that are expected to be deployed, the method includes selecting, according to the load status information of each node, a node with lowest load on which the to-be-deployed image is not deployed, to deploy the to-be-deployed image. After a quantity of to-be-deployed images that are expected to be deployed is determined, a proper node is selected to deploy the image, so that the nodes on which the image is deployed can quickly start the containers without obtaining the image when the containers are being started. It should be noted that in the fourth implementation of the first aspect, in addition to obtaining the load status information of each node and the list of an image deployed on each node, a deployment status of a container on each node is obtained. The deployment status includes information about a quantity of containers deployed on each node and types of images corresponding to the containers.

A second aspect of the embodiments of the present invention provides an image deployment apparatus, including a receiving unit, configured to obtain a configuration policy for a container, where the configuration policy for the container includes an autoscaling policy or a replication control policy. The autoscaling policy includes a first image identifier, a maximum quantity of containers that are corresponding to the first image identifier and that can be deployed, and a quantity of currently deployed containers corresponding to the first image identifier. The replication control policy includes a second image identifier and a quantity of containers that are corresponding to the second image identifier and that are expected to be deployed. The image deployment apparatus also includes a processing unit, configured to determine an identifier of a to-be-deployed image according to the configuration policy for the container.

With reference to the second aspect, in a first implementation of the second aspect, the receiving unit is further configured to obtain popularity information of an image, where the popularity information of the image includes a third image identifier and a popularity index of the image corresponding to the third image identifier. The processing unit is further configured to determine the identifier of the to-be-deployed image according to the popularity information of the image.

With reference to the second aspect or the first implementation of the second aspect, in a second implementation of the second aspect, the processing unit is further configured to determine, according to the configuration policy for the container corresponding to the identifier of the to-be-deployed image, a quantity of containers that are corresponding to the to-be-deployed image and that are expected to be deployed.

With reference to the first implementation of the second aspect, in a third implementation of the second aspect, the processing unit is further configured to determine, according to the configuration policy for the container corresponding to the identifier of the to-be-deployed image and the popularity information of the to-be-deployed image, a quantity of containers that are corresponding to the to-be-deployed image and that are expected to be deployed.

With reference to the second or the third implementation of the second aspect, in a fourth implementation of the second aspect, the image deployment apparatus further includes a selection unit, configured to obtain load status information of each node and a list of an image deployed on each node and determine a value relationship between a quantity of containers that are corresponding to the to-be-deployed image and that have been deployed and the quantity of containers that are corresponding to the to-be-deployed image and that are expected to be deployed. If the quantity of containers that are corresponding to the to-be-deployed image and that have been deployed is less than the quantity of containers that are corresponding to the to-be-deployed image and that are expected to be deployed, the selection unit is further configured to select, according to the load status information of each node, a node with lowest load on which the to-be-deployed image is not deployed, to deploy the to-be-deployed image. It should be noted that in the fourth implementation of the second aspect, in addition to obtaining the load status information of each node and the list of an image deployed on each node, a deployment status of a container on each node is obtained. The deployment status includes information about a quantity of containers deployed on each node and types of images corresponding to the containers.

A third aspect of the embodiments of the present invention provides a computer system, including a processor, a memory, and a bus, where the processor communicates with the memory by using the bus. The memory is configured to store a computer-executable instruction, and the processor is configured to execute the computer-executable instruction. The processor is further configured to obtain a configuration policy for a container, where the configuration policy for the container includes an autoscaling policy or a replication control policy. The autoscaling policy includes a first image identifier, a maximum quantity of containers that are corresponding to the first image identifier and that can be deployed, and a quantity of currently deployed containers corresponding to the first image identifier. The replication control policy includes a second image identifier and a quantity of containers that are corresponding to the second image identifier and that are expected to be deployed. The processor is further configured to determine an identifier of a to-be-deployed image according to the configuration policy for the container.

With reference to the third aspect, in a first implementation of the third aspect, the processor is further configured to obtain popularity information of an image, where the popularity information of the image includes a third image identifier and a popularity index of the image corresponding to the third image identifier. The determining an identifier of a to-be-deployed image according to the configuration policy for the container further includes determining the identifier of the to-be-deployed image according to the popularity information of the image.

With reference to the third aspect or the first implementation of the third aspect, in a second implementation of the third aspect, the processor is further configured to determine, according to the configuration policy for the container corresponding to the identifier of the to-be-deployed image, a quantity of containers that are corresponding to the to-be-deployed image and that are expected to be deployed.

With reference to the first implementation of the third aspect, in a third implementation of the third aspect, the processor is further configured to determine, according to the configuration policy for the container corresponding to the identifier of the to-be-deployed image and the popularity information of the to-be-deployed image, a quantity of containers that are corresponding to the to-be-deployed image and that are expected to be deployed.

With reference to the second or the third implementation of the third aspect, in a fourth implementation of the third aspect, the processor is further configured to obtain load status information of each node and a list of an image deployed on each node and determine a value relationship between a quantity of containers that are corresponding to the to-be-deployed image and that have been deployed and the quantity of containers that are corresponding to the to-be-deployed image and that are expected to be deployed. If the quantity of containers that are corresponding to the to-be-deployed image and that have been deployed is less than the quantity of containers that are corresponding to the to-be-deployed image and that are expected to be deployed, the processor is configured to select, according to the load status information of each node, a node with lowest load on which the to-be-deployed image is not deployed, to deploy the to-be-deployed image. It should be noted that in the fourth implementation of the third aspect, in addition to obtaining the load status information of each node and the list of an image deployed on each node, a deployment status of a container on each node is obtained. The deployment status includes information about a quantity of containers deployed on each node and types of images corresponding to the containers.

According to the image deployment method and apparatus, and the computer system provided in the embodiments of the present invention, an autoscaling policy or a replication control policy for a container corresponding to each image is obtained, so as to select identifiers of to-bedeployed images, and determine nodes on which the images are to be deployed, so that before starting a corresponding container, the nodes can obtain a corresponding image from the image repository. This avoids time consumption required for downloading an image from the image repository when a node starts a container, and improves container start efficiency.

BRIEF DESCRIPTION OF THE DRAWINGS

To describe the technical solutions in the embodiments of the present invention more clearly, the following briefly describes the accompanying drawings required for the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. The term "image" in this specification generally includes a file system that is of an application and that may be used to support running of a container, for example, a popular application container engine Docker. Generally, a container developer usually develops a Dockerfile of an application based on the Docker, and generates a Docker image based on the Dockerfile. After obtaining the Docker image, a node or a host creates a Docker container.

The term "image repository" in this specification indicates a database that stores an image and is usually referred to as a Docker Hub. Most of image repositories are public and are generally maintained by an image publisher, for example, an Aliyun Docker image repository.

The term "container resource management platform" in this specification generally indicates a platform for deploying and scheduling a container on each node. A function of the platform includes managing a resource view (CPU utilization, memory utilization, a network utilization status, a storage utilization status, and the like) of each node, a container distribution view of each node, and the like.

Figure 1:
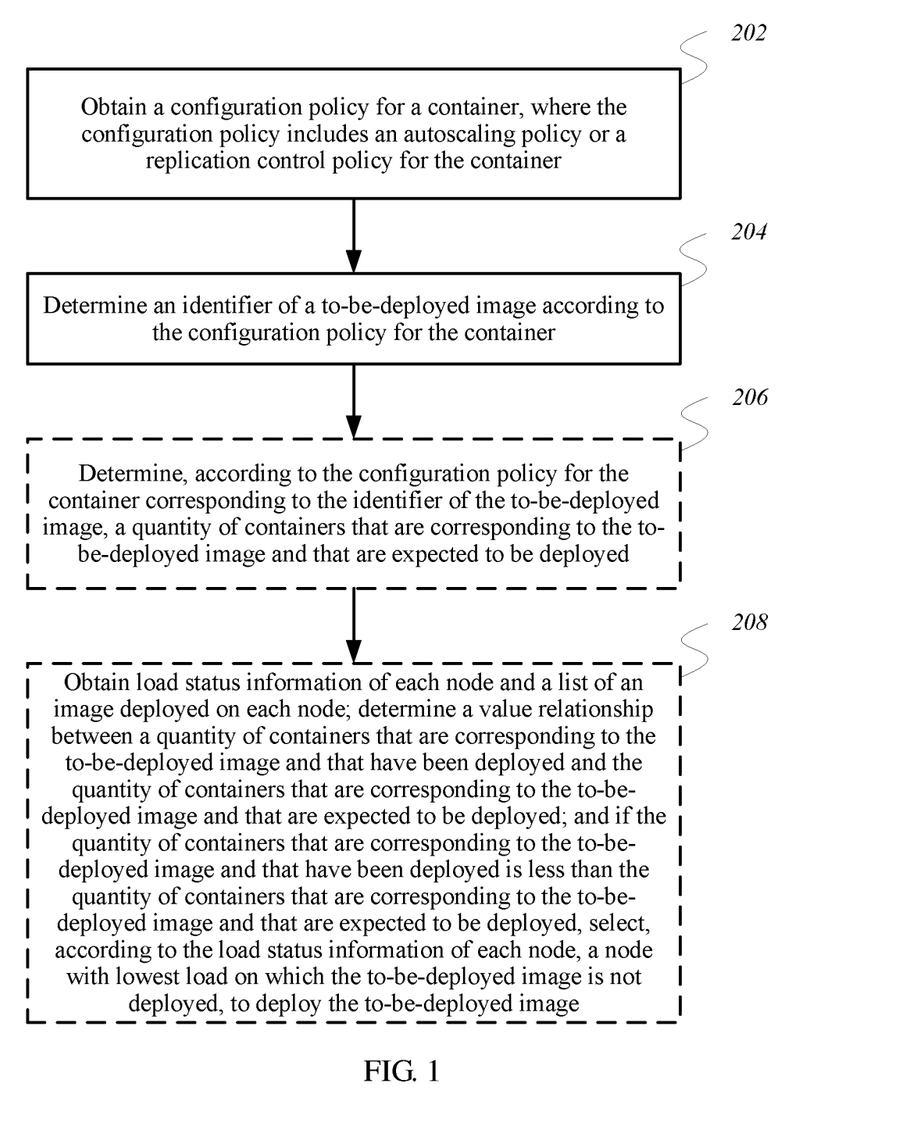
FIG. 1 is a schematic flowchart of an image deployment method applied to a method embodiment of the present invention.

One embodiment is a method that describes an image deployment method in detail. The method is usually used in a container deployment and application system. A schematic flowchart of the method is shown in FIG. 1. The method includes the following steps.

Step 202: Obtain a configuration policy for a container, where the configuration policy includes an autoscaling policy or a replication control policy for the container. The autoscaling policy for the container includes a first image identifier, a maximum quantity of containers that are corresponding to the first image identifier and that can be deployed, and a quantity of currently deployed containers corresponding to the first image identifier, as shown in Table 1. The autoscaling policy for the container is generally used to manage a deployment status of a container corresponding to an image in the system, for example, a maximum quantity of containers that can be deployed, a minimum quantity of containers that can be deployed, and a quantity of currently deployed containers. The replication control policy for the container includes a second image identifier and a quantity of containers that are corresponding to the second image identifier and that are expected to be deployed, as shown in Table 2. Herein, the quantity of containers that are expected to be deployed is a preset quantity of containers that are expected to be deployed. The replication control policy for the container is also used to manage a deployment status of a container corresponding to an image, for example, a quantity of containers that need to be deployed in the system and a quantity of hosts or nodes on which the container needs to be deployed. The container corresponding to the first image identifier indicates a container that runs an image corresponding to the first image identifier. A case of a container corresponding to another image is similar to this case.

TABLE 1

| Image identifier | Maximum quantity of containers that can be deployed | Quantity of currently deployed containers |
| --- | --- | --- |
| A | 30 | 5 |
| B | 40 | 10 |

TABLE 2

| Image identifier | Quantity of containers that are expected to be deployed |
| --- | --- |
| C | 20 |
| D | 50 |

Step 204: Determine an identifier of a to-be-deployed image according to the configuration policy for the container.

Specifically, the configuration policy for the container includes an image identifier corresponding to the container. Therefore, the identifier of the to-be-deployed image can be directly determined. For example, when the configuration policy for the container is the autoscaling policy, it may be set in such a manner that the image identifier corresponding to the container is the identifier of the to-be-deployed image when the maximum quantity of containers that can be deployed is greater than a preset threshold. When the configuration policy for the container is the replication control policy, it may be set in such a manner that the image identifier corresponding to the container is the identifier of the to-be-deployed image when the quantity of containers that are expected to be deployed is greater than a preset threshold. In the container deployment and application system, not all types of containers have corresponding configuration policies. Therefore, it may be set in such a manner that image identifiers corresponding to all containers having configuration policies are the identifier of the to-be-deployed image.

Optionally, step 202 further includes: obtaining popularity information of an image. The popularity information of the image is used to indicate a popularity index of each image in an image repository, for example, a quantity of downloads, a quantity of clicks, and a comment score. The popularity information of the image includes a third image identifier and a popularity index of the image corresponding to the third image identifier. Alternatively, the popularity information of the image in step 202 may be identifiers of n most popular images in an image repository, and n herein is a preset number.

It should be noted that the configuration policy for the container and the popularity information of the image may be obtained in any sequence or may be periodically obtained. Generally, the popularity information of the image is from the image repository.

Optionally, when the popularity information of the image is further obtained in step 202, step 204 further includes: determining the identifier of the to-be-deployed image according to the popularity information of the image.

Specifically, the configuration policy for the container and the popularity information of the image each include an image identifier. Therefore, in step 204, in addition to determining the identifier of the to-be-deployed image according to the configuration policy for the container, the identifier of the to-be-deployed image may be determined according to the popularity information of the image. For example, identifiers of m most popular images are selected from the popularity information of the image, and m herein is a preset number. Alternatively, in step 204, the identifier of the to-be-deployed image may be determined by comprehensively considering the configuration policy for the container and the popularity information of the image.

Optionally, after step 204, the method further includes step 206. Step 206: Determine, according to the configuration policy for the container corresponding to the identifier of the to-be-deployed image, a quantity of containers that are corresponding to the to-be-deployed image and that are expected to be deployed.

Specifically, if identifiers of a plurality of to-be-deployed images are determined in step 204, in step 206, a quantity of containers that are corresponding to each to-be-deployed image and that are expected to be deployed may be determined according to each parameter in a configuration policy for a container corresponding to an identifier of each to-be-deployed image. For example, if a given maximum quantity of containers that can be deployed is 50, a quantity of containers that are expected to be deployed may be set to 50×Q. A value of Q may be designed according to an actual requirement.

Optionally, if the popularity information of the image is further obtained in step 202, in step 206, the quantity of containers that are corresponding to the to-be-deployed image and that are expected to be deployed may be determined according to popularity information of each to-be-deployed image and each parameter in a configuration policy for a container corresponding to an identifier of each to-be-deployed image, for example, a quantity of to-be-deployed images A=f. Herein, f is a preset function representing a parameter for popularity information in a configuration policy for the image A.

It should be noted that the following case may occur: A configuration policy for a container corresponding to an identifier of an image exists, but popularity information of the image corresponding to the identifier of the image does not exist. In this case, impact of the popularity information of the image on f can be eliminated.

Optionally, when step 206 is performed after step 204, after step 206, the method further includes step 208. Step 208: Obtain load status information of each node and a list of an image deployed on each node; determine a value relationship between a quantity of containers that are corresponding to the to-be-deployed image and that have been deployed and the quantity of containers that are corresponding to the to-be-deployed image and that are expected to be deployed; and if the quantity of containers that are corresponding to the to-be-deployed image and that have been deployed is less than the quantity of containers that are corresponding to the to-be-deployed image and that are expected to be deployed, select, according to the load status information of each node, a node with lowest load on which the to-be-deployed image is not deployed, to deploy the to-be-deployed image. It should be noted that in step 208, in addition to obtaining the load status information of each node and the list of an image deployed on each node, a deployment status of a container on each node is obtained. The deployment status includes a quantity of containers deployed on each node and types of the containers, that is, types of images corresponding to the containers.

For example, in step 206, it is determined that a quantity of containers A that are expected to be deployed is 50, and a quantity of containers A that have been deployed on each node is obtained. If the quantity is less than 50, a new node further needs to be selected to deploy the to-be-deployed image. If the quantity of containers that are corresponding to the to-be-deployed image and that have been deployed is not less than the quantity of containers that are corresponding to the to-be-deployed image and that are expected to be deployed, there is no need to further select a node to deploy the to-be-deployed image.

In step 208, after the node with lowest load is selected from nodes on which the to-be-deployed image is not deployed, if remaining resources of the node are insufficient to support P containers, where P herein is a difference between the quantity of containers that are corresponding to the to-be-deployed image and that are expected to be deployed and the quantity of containers that are corresponding to the to-be-deployed image and that have been deployed, in step 208, a node with the second lowest load on which the to-be-deployed image is not deployed needs to be further selected to deploy the to-be-deployed image. The selection process is continuously repeated until remaining resources of a node selected to deploy the to-be-deployed image are sufficient to support start of the P containers.

The load status information of each node includes a node identifier and a load status corresponding to the node, for example, CPU utilization and memory utilization, as shown in Table 3. The list of an image deployed on each node includes a correspondence between a node identifier and an identifier of the image deployed on the node, as shown in Table 4. A quantity of deployed images corresponding to each image identifier can be obtained by using the list of an image deployed on each node.

TABLE 3

| Node identifier | CPU utilization | Memory utilization |
|---|---|---|
| 1 | 30% | 50% |
| 3 | 40% | 60% |

TABLE 4

| Node identifier | Image identifier |
|---|---|
| 1 | A, E |
| 3 | B, C |

Step 202 to step 208 may all be performed by an image deployment apparatus. In this case, in step 208, the load status information of each node and the list of an image deployed on each node needs to be obtained from a container resource management platform. Then, after obtaining an identifier of each to-be-deployed image and an identifier of a node on which the to-be-deployed image needs to be deployed, as shown in Table 5, the image deployment apparatus sends the table to the container resource management platform, so that the container resource management platform instructs, according to the table, a node 1 and a node 3 to obtain, from the image repository, an image whose image identifier is E, and the node 1 and a node 5 to obtain, from the image repository, an image whose image identifier is F.

Step 202 to step 206 may all be performed by an image deployment apparatus, and step 208 is performed by a container resource management platform. In this case, in step 206, after obtaining the quantity of containers that are corresponding to the to-be-deployed image and that are expected to be deployed, the image deployment apparatus sends the quantity to the container resource management platform. After obtaining, by performing step 208, an identifier of each to-be-deployed image and an identifier of a node on which the to-be-deployed image needs to be deployed, as shown in Table 5, the container resource management platform instructs a node 1 and a node 3 to obtain, from the image repository, an image whose image identifier is E, and the node 1 and a node 5 to obtain, from the image repository, an image whose image identifier is F.

TABLE 5

| Image identifier | Node identifier |
| --- | --- |
| E | Node 1, node 3 |
| F | Node 1, node 5 |

The foregoing embodiment provides an image deployment method. An autoscaling policy or a replication control policy for a container corresponding to each image is obtained, so as to select identifiers of to-be-deployed images, and determine nodes on which the images are to be deployed, so that before starting a corresponding container, the nodes can obtain a corresponding image from the image repository. This avoids time consumption required for downloading an image from the image repository when a node starts a container, and improves container start efficiency.

Figure 2:
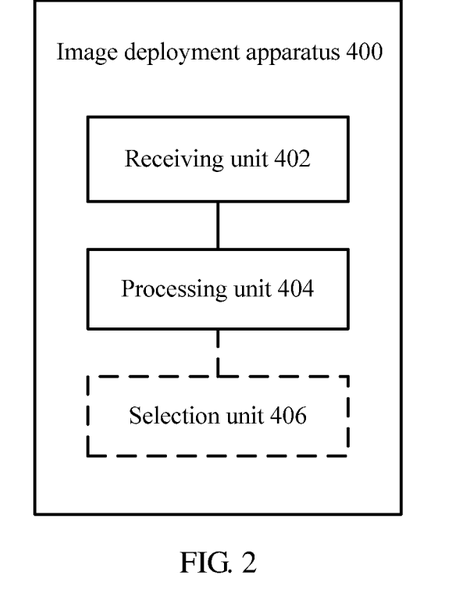
FIG. 2 is a schematic diagram of a compositional structure of an image deployment apparatus applied to an apparatus embodiment of the present invention.

One embodiment is an apparatus that describes an image deployment apparatus 400 in detail. The apparatus is usually used in a container deployment and application system. A schematic diagram of a compositional structure of the apparatus is shown in FIG. 2. The apparatus includes a receiving unit 402 and a processing unit 404:

The receiving unit 402 is configured to obtain a configuration policy for a container. The configuration policy for the container includes an autoscaling policy or a replication control policy. The autoscaling policy includes a first image identifier, a maximum quantity of containers that are corresponding to the first image identifier and that can be deployed, and a quantity of currently deployed containers corresponding to the first image identifier. The replication control policy includes a second image identifier and a quantity of containers that are corresponding to the second image identifier and that are expected to be deployed.

Specifically, the receiving unit 402 is configured to perform step 202 and all optional methods of step 202 in the method embodiment.

Optionally, the receiving unit 402 is further configured to obtain popularity information of an image. The popularity information of the image includes a third image identifier and a popularity index of the image corresponding to the third image identifier.

The processing unit 404 is configured to determine an identifier of a to-be-deployed image according to the configuration policy that is for the container and that is obtained by the receiving unit 402.

Specifically, the processing unit 404 is configured to perform step 204 and all optional methods of step 204 and step 206 and all optional methods of step 206 in the method embodiment.

Optionally, when the receiving unit 402 obtains the popularity information of the image, the processing unit 404 is further configured to determine the identifier of the to-be-deployed image according to the popularity information of the image.

Optionally, after obtaining the identifier of the to-be-deployed image, the processing unit 404 further determines, according to the configuration policy for the container corresponding to the identifier of the to-be-deployed image, a quantity of containers that are corresponding to the to-be-deployed image and that are expected to be deployed.

Optionally, when the receiving unit 402 obtains the popularity information of the image, after obtaining the identifier of the to-be-deployed image, the processing unit 404 is further configured to determine, according to the configuration policy for the container corresponding to the identifier of the to-be-deployed image and the popularity information of the to-be-deployed image, a quantity of containers that are corresponding to the to-be-deployed image and that are expected to be deployed.

Optionally, the image deployment apparatus 400 further includes a selection unit 406, configured to perform step 208, that is, all details of step 208 in the method embodiment.

The selection unit 406 is configured to: obtain load status information of each node and a list of an image deployed on each node; determine a value relationship between a quantity of containers that are corresponding to the to-be-deployed image and that have been deployed and the quantity of containers that are corresponding to the to-be-deployed image and that are expected to be deployed; and if the quantity of containers that are corresponding to the to-be-deployed image and that have been deployed is less than the quantity of containers that are corresponding to the to-be-deployed image and that are expected to be deployed, select, according to the load status information of each node, a node with lowest load on which the to-be-deployed image is not deployed, to deploy the to-be-deployed image.

It should be noted that, in addition to obtaining the load status information of each node and the list of an image deployed on each node, the selection unit 406 obtains a deployment status of a container on each node. The deployment status includes a quantity of containers deployed on each node and types of the containers, that is, types of images corresponding to the containers.

In actual use, the units of the image deployment apparatus 400 may be deployed in the following two manners:

Manner 1: The receiving unit 402, the processing unit 404, and the selection unit 406 are all located in an independent management apparatus. The management apparatus needs to obtain, periodically or when being triggered, from a container resource management platform, the load status information of each node and the list of an image deployed on each node. After obtaining an identifier of each to-be-deployed image and an identifier of a node on which the to-be-deployed image needs to be deployed, as shown in Table 5, the management apparatus sends the table to the container resource management platform, so that the container resource management platform instructs, according to the table, a node 1 and a node 3 to obtain, from an image repository, an image whose image identifier is E, and the node 1 and a node 5 to obtain, from the image repository, an image whose image identifier is F.

Manner 2: The receiving unit 402 and the processing unit 404 are located in an independent management apparatus, and the selection unit 406 is located in a container resource management platform. In this case, after obtaining the quantity of containers that are corresponding to the to-be-deployed image and that are expected to be deployed, the processing unit 404 sends the quantity to the selection unit 406. After directly obtaining, from the resource management platform, an identifier of each to-be-deployed image and an identifier of a node on which the to-be-deployed image needs to be deployed, as shown in Table 5, the selection unit 406 instructs a node 1 and a node 3 to obtain, from an image repository, an image whose image identifier is E, and the node 1 and a node 5 to obtain, from the image repository, an image whose image identifier is F.

The foregoing embodiment provides the image deployment apparatus. The apparatus obtains an autoscaling policy or a replication control policy for a container corresponding to each image, so as to select identifiers of to-be-deployed images, and determine nodes on which the images are to be deployed, so that before starting a corresponding container, the nodes can obtain a corresponding image from the image repository. Use of the apparatus avoids time consumption required for downloading an image from the image repository when a node starts a container, and improves container start efficiency.

Figure 3:
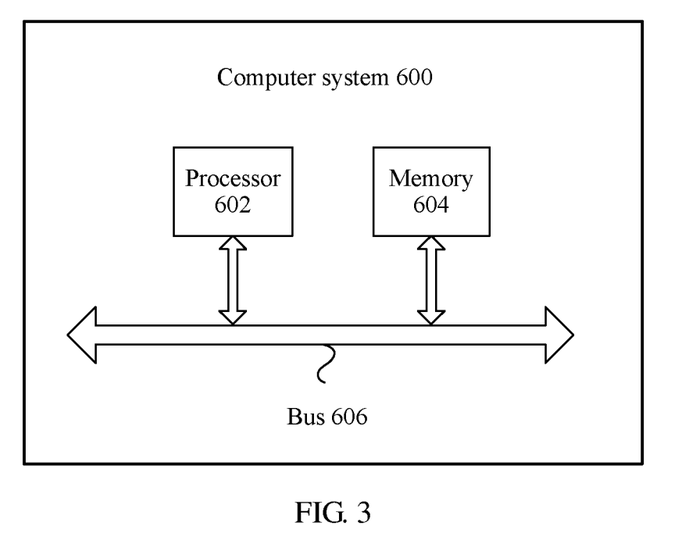
FIG. 3 is a schematic diagram of a compositional structure of a computer system applied to a system embodiment of the present invention.

One embodiment is a system that describes a computer system 600 in detail. The system is usually used in a container deployment and application system. A schematic diagram of a compositional structure of the system is shown in FIG. 3. The system includes a processor 602, a memory 604, and a bus 606. The processor 602 communicates with the memory 604 by using the bus 606.

The memory 604 is configured to store a computer-executable instruction, and the processor 602 is configured to execute the computer-executable instruction stored in the memory 604.

The processor 602 is further configured to obtain a configuration policy for a container, where the configuration policy for the container includes an autoscaling policy or a replication control policy. The autoscaling policy includes a first image identifier, a maximum quantity of containers that are corresponding to the first image identifier and that can be deployed, and a quantity of currently deployed containers corresponding to the first image identifier. The replication control policy includes a second image identifier and a quantity of containers that are corresponding to the second image identifier and that are expected to be deployed. The processor is also configured to determine an identifier of a to-be-deployed image according to the configuration policy for the container. In actual use, after executing the computer-executable instruction stored in the memory 604, the processor 602 performs step 202 and step 204 and all optional actions of step 202 and all optional actions of step 204 in the method embodiment.

Optionally, the processor 602 is further configured to obtain popularity information of an image, where the popularity information of the image includes a third image identifier and a popularity index of the image corresponding to the third image identifier. The determining an identifier of a to-be-deployed image according to the configuration policy for the container further includes determining the identifier of the to-be-deployed image according to the popularity information of the image.

Optionally, the processor 602 is further configured to determine, according to the configuration policy for the container corresponding to the identifier of the to-be-deployed image, a quantity of containers that are corresponding to the to-be-deployed image and that are expected to be deployed. That is, the processor 602 is further configured to perform step 206 and all optional actions of step 206 in the method embodiment.

Optionally, the processor 602 is further configured to determine, according to the configuration policy for the container corresponding to the identifier of the to-be-deployed image and the popularity information of the to-be-deployed image, a quantity of containers that are corresponding to the to-be-deployed image and that are expected to be deployed.

Optionally, the processor 602 is further configured to: obtain load status information of each node and a list of an image deployed on each node; determine a value relationship between a quantity of containers that are corresponding to the to-be-deployed image and that have been deployed and the quantity of containers that are corresponding to the to-be-deployed image and that are expected to be deployed; and if the quantity of containers that are corresponding to the to-be-deployed image and that have been deployed is less than the quantity of containers that are corresponding to the to-be-deployed image and that are expected to be deployed, select, according to the load status information of each node, a node with lowest load on which the to-be-deployed image is not deployed, to deploy the to-be-deployed image. That is, the processor 602 is further configured to perform step 208 in the method embodiment. It should be noted that, in addition to obtaining the load status information of each node and the list of an image deployed on each node, the processor 602 obtains a deployment status of a container on each node. The deployment status includes a quantity of containers deployed on each node and types of the containers, that is, types of images corresponding to the containers.

The foregoing embodiment provides the computer system. In the system, an autoscaling policy or a replication control policy for a container corresponding to each image is obtained, so as to select identifiers of to-be-deployed images, and determine nodes on which the images are to be deployed, so that before starting a corresponding container, the nodes can obtain a corresponding image from an image repository. Use of the system avoids time consumption required for downloading an image from the image repository when a node starts a container, and improves container start efficiency.

It should be noted that, for ease of description, the foregoing method embodiments are described as a series of action combinations. However, persons skilled in the art should understand that the present invention is not limited to the described sequence of the actions, because some steps may be performed in another sequence or performed at the same time according to the present invention. In addition, persons skilled in the art should also understand that the embodiments described in this specification are all embodiments, and the involved actions and units are not necessarily mandatory to the present invention.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    obtaining a configuration policy for a container to determine an image at a node device prior to the image being deployed, wherein the image is an application image, wherein the node device runs the image within the container, wherein the configuration policy for the container comprises an autoscaling policy or a replication control policy, wherein the autoscaling policy comprises a first image identifier, a maximum quantity of deployable containers corresponding to the first image identifier, and a quantity of currently deployed containers corresponding to the first image identifier, and wherein the replication control policy comprises a second image identifier and a quantity of containers corresponding to the second image identifier that are expected to be deployed; and
    determining an identifier of the image according to the configuration policy for the container, wherein, in response to the configuration policy comprising the autoscaling policy, the maximum quantity of deployable containers for the image is greater than a first preset threshold, wherein, in response to the configuration policy comprising the replication control policy, the quantity of containers that are expected to be deployed for the image is greater than a second preset threshold, and wherein the identifier of the image is provided to the node device to instruct the node device to obtain the image.

2. The method according to claim 1, further comprising:
    obtaining popularity information of an image, wherein the popularity information of the image comprises a third image identifier and a popularity index of the image corresponding to the third image identifier; and
    replacing the identifier of the image with the third image identifier according to the popularity information of the image prior to the image being deployed.

3. The method according to claim 1, further comprising:
    determining, according to the configuration policy, a quantity of containers corresponding to the image that are expected to be deployed prior to the image being deployed.

4. The method according to claim 2, further comprising:
    determining, according to the configuration policy, a quantity of containers corresponding to the image that are expected to be deployed prior to the image being deployed.

5. The method according to claim 2, further comprising:
    determining, according to the configuration policy and the popularity information of the image, a quantity of containers corresponding to the image that are expected to be deployed prior to the image being deployed.

6. The method according to claim 3, further comprising:
    obtaining load status information of each node device of a plurality of node devices and a list of one or more images deployed on each node device of the plurality of node devices, wherein the plurality of node devices includes the node device;
    comparing a quantity of containers corresponding to the image that have been deployed to the quantity of containers corresponding to the image that are expected to be deployed; and
    in response to determining that the quantity of containers corresponding to the image that have been deployed is less than the quantity of containers corresponding to the image that are expected to be deployed, selecting, according to the load status information of each node device, a node device with lowest load on which the image is not deployed, to deploy the image.

7. The method according to claim 4, further comprising:
    obtaining load status information of each node device of a plurality of node devices and a list of one or more images deployed on each node device of the plurality of node devices, wherein the plurality of node devices includes the node device;
    comparing a quantity of containers corresponding to the image that have been deployed to the quantity of containers corresponding to the image that are expected to be deployed; and
    in response to determining that the quantity of containers corresponding to the image that have been deployed is less than the quantity of containers corresponding to the image that are expected to be deployed, selecting, according to the load status information of each node device, a node device with lowest load on which the image is not deployed, to deploy the image.

8. The method according to claim 5, further comprising:
    obtaining load status information of each node device of a plurality of node devices and a list of one or more images deployed on each node device of the plurality of node devices, wherein the plurality of node devices includes the node device;
    comparing a quantity of containers corresponding to the image that have been deployed to the quantity of containers corresponding to the image that are expected to be deployed; and
    when in response to determining that the quantity of containers corresponding to the image that have been deployed is less than the quantity of containers corresponding to the image that are expected to be deployed, selecting, according to the load status information of each node device, a node device with lowest load on which the image is not deployed, to deploy the image.

9. An image deployment apparatus, comprising:
    a receiver, configured to obtain a configuration policy for a container to determine an image at a node device, wherein the image is an application image, wherein the node device runs the image within the container, wherein the configuration policy for the container comprises an autoscaling policy or a replication control policy, wherein the autoscaling policy comprises a first image identifier, a maximum quantity of deployable containers corresponding to the first image identifier, and a quantity of currently deployed containers corresponding to the first image identifier, and wherein the replication control policy comprises a second image identifier and a quantity of containers corresponding to the second image identifier that are expected to be deployed; and a processor, configured to determine an identifier of the image according to the configuration policy for the container, wherein, in response to determining the configuration policy comprises an autoscaling policy, the maximum quantity of deployable containers for the image is greater than a first preset threshold, wherein in response to determining the configuration policy comprises a replication control policy, the quantity of containers that are expected to be deployed for the image is greater than a second preset threshold, wherein the identifier of the image is provided to the node device to instruct the node device to obtain the image.

10. The image deployment apparatus according to claim 9, wherein the receiver is further configured to obtain popularity information of an image, wherein the popularity information of the image comprises a third image identifier and a popularity index of the image corresponding to the third image identifier, and wherein the processing unit is further configured to replace the identifier of the image with the third image identifier according to the popularity information of the image prior to the image being deployed.

11. The image deployment apparatus according to claim 9, wherein the processor is further configured to determine, according to the configuration policy, a quantity of containers corresponding to the image that are expected to be deployed prior to the image being deployed.

12. The image deployment apparatus according to claim 10, wherein the processor is further configured to determine, according to the configuration policy and the popularity information of the image, a quantity of containers corresponding to the image that are expected to be deployed prior to the image being deployed.

13. The image deployment apparatus according to claim 11, wherein the receiver is further configured to obtain load status information of each node device of a plurality of node devices and a list of one or more images deployed on each node device of the plurality of node devices, wherein the plurality of node devices includes the node device, wherein the processor is further configured to:

compare a quantity of containers corresponding to the image that have been deployed to the quantity of containers corresponding to the image and that are expected to be deployed; and in response to determining that the quantity of containers corresponding to the image that have been deployed is less than the quantity of containers corresponding to the image that are expected to be deployed, the processor is further configured to select, according to the load status information of each node device, a node device with lowest load on which the image is not deployed, to deploy the image.

14. The image deployment apparatus according to claim 12, wherein the receiver is further configured to obtain load status information of each node device of a plurality of node devices and a list of one or more images deployed on each node device of the plurality of node devices, wherein the plurality of node devices includes the node device, wherein the processor is further configured to:

compare a quantity of containers corresponding to the image that have been deployed to the quantity of containers corresponding to the image and that are expected to be deployed; and in response to determining that the quantity of containers corresponding to the image that have been deployed is less than the quantity of containers corresponding to the image that are expected to be deployed, the processor is further configured to select, according to the load status information of each node device, a node device with lowest load on which the image is not deployed, to deploy the image.

15. A computer system, comprising a processor, a non-transitory computer-readable storage medium storing a program to be executed by the processor, and a bus, wherein the processor communicates with the storage medium by using the bus, wherein the program includes instructions for:

obtaining a configuration policy for a container to determine an image at a node device, wherein the image is an application image, wherein the node device runs the image within the container, wherein the configuration policy for the container comprises an autoscaling policy or a replication control policy, wherein the autoscaling policy comprises a first image identifier, a maximum quantity of deployable containers corresponding to the first image identifier, and a quantity of currently deployed containers corresponding to the first image identifier, and wherein the replication control policy comprises a second image identifier and a quantity of containers corresponding to the second image identifier that are expected to be deployed; and determining an identifier of a image according to the configuration policy for the container, wherein in response to determining the configuration policy comprises an autoscaling policy, the identifier of the image corresponds to an image where the maximum quantity of deployable containers is greater than a first preset threshold, wherein in response to determining the configuration policy comprises a replication control policy, the identifier of the image corresponds to an image where the quantity of containers that are expected to be deployed is greater than a second preset threshold, wherein the identifier of the image is provided to the node device to instruct the node device to obtain an image corresponding to the identifier of the image.

16. The computer system according to claim 15, wherein the program further includes instructions for:

obtaining popularity information of an image, wherein the popularity information of the image comprises a third image identifier and a popularity index of the image corresponding to the third image identifier; and replacing the identifier of the image with the third image identifier according to the popularity information of the image prior to the image being deployed.

17. The computer system according to claim 15, wherein the program further includes instructions for determining, according to the configuration policy, a quantity of containers corresponding to the image that are expected to be deployed prior to the image being deployed.

18. The computer system according to claim 16, wherein the program further includes instructions for determining, according to the configuration policy and the popularity information of the image, a quantity of containers corresponding to the image that are expected to be deployed prior to the image being deployed.

19. The computer system according to claim 17, wherein the program includes instructions for:

obtaining load status information of each node device of a plurality of node devices and a list of one or more images deployed on each node device of the plurality of node devices, wherein the plurality of node devices includes the node device;

comparing a quantity of containers corresponding to the image that have been deployed to the quantity of containers corresponding to the image that are expected to be deployed; and in response to determining that the quantity of containers corresponding to the image that have been deployed is less than the quantity of containers corresponding to the image that are expected to be deployed, selecting, according to the load status information of each node device, a node device with lowest load on which the image is not deployed, to deploy the image.

20. The computer system according to claim 18, wherein the program includes instructions for:

obtaining load status information of each node device of a plurality of node devices and a list of one or more images deployed on each node device of the plurality of node devices, wherein the plurality of node devices includes the node device;

comparing a quantity of containers corresponding to the image that have been deployed to the quantity of containers corresponding to the image that are expected to be deployed; and in response to determining the quantity of containers corresponding to the image that have been deployed is less than the quantity of containers corresponding to the image that are expected to be deployed, selecting, according to the load status information of each node device, a node device with lowest load on which the image is not deployed, to deploy the image.

* * * * *

UNITED STATES PATENT AND TRADEMARK OFFICE
CERTIFICATE OF CORRECTION

PATENT NO. : 10,877,772 B2
APPLICATION NO. : 15/916895
DATED : December 29, 2020
INVENTOR(S) : Hang Wang et al.

Page 1 of 1

It is certified that error appears in the above-identified patent and that said Letters Patent is hereby corrected as shown below:

In the Claims

In Column 14, Line 48, Claim 8, delete "when".

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*